United States Patent
Watanabe

(10) Patent No.: US 12,541,188 B2
(45) Date of Patent: Feb. 3, 2026

(54) NUMERICAL CONTROLLER AND CONTROL METHOD

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 523 days.

(21) Appl. No.: 18/014,374

(22) PCT Filed: Jul. 26, 2021

(86) PCT No.: PCT/JP2021/027494
§ 371 (c)(1),
(2) Date: Jan. 4, 2023

(87) PCT Pub. No.: WO2022/024975
PCT Pub. Date: Feb. 3, 2022

(65) Prior Publication Data
US 2023/0305521 A1    Sep. 28, 2023

(30) Foreign Application Priority Data
Jul. 30, 2020   (JP) .................. 2020-129217

(51) Int. Cl.
*G05B 19/4093*   (2006.01)
(52) U.S. Cl.
CPC .............. *G05B 19/40931* (2013.01)
(58) Field of Classification Search
CPC .......... G05B 19/40931; G05B 19/4097; G05B 2219/50087; G05B 2219/50091; G16Y 10/25; B23B 1/00
See application file for complete search history.

(56) References Cited

U.S. PATENT DOCUMENTS

2005/0222706 A1* 10/2005 Muraki ............ G05B 19/40938
700/86
2016/0089760 A1* 3/2016 Asano .................. G05B 19/404
700/160
(Continued)

FOREIGN PATENT DOCUMENTS

CN    202239684    5/2012
CN    104423322    3/2015
(Continued)

OTHER PUBLICATIONS

International Search Report issued Oct. 21, 2021, in International (PCT) Application No. PCT/JP2021/027494, with English translation.

*Primary Examiner* — Christopher E. Everett
(74) *Attorney, Agent, or Firm* — Wenderoth, Lind & Ponack, L.L.P.

(57) ABSTRACT

A numerical control device includes an NC command decoding unit and a tool information storage/generation unit. The NC command decoding unit has a cut amount decoding unit for decoding the cut amount for rough machining, a machining shape generation unit for generating a finishing shape, a machining pathway generation unit for generating a path for rough machining, a tool direction provisional determining unit for provisionally determining the direction of the tool, a path joining assessment unit for assessing whether or not to omit a round-up operation, a machining path joining unit for generating a new path for directly moving to the end point of the next operation after the round-up operation if the round-up operation is to be omitted, and a tool direction determining unit for determining the direction of the tool at each machining shape change point on a path for rough machining including the new path.

5 Claims, 9 Drawing Sheets

(56) References Cited

U.S. PATENT DOCUMENTS

| | | | |
|---|---|---|---|
| 2017/0308060 A1* | 10/2017 | Matsubara | G05B 19/402 |
| 2019/0160552 A1* | 5/2019 | Eto | G05B 19/4097 |
| 2019/0235474 A1* | 8/2019 | Eto | G05B 19/4099 |
| 2020/0050168 A1* | 2/2020 | Matsumura | G05B 19/4093 |

FOREIGN PATENT DOCUMENTS

| | | |
|---|---|---|
| CN | 105278467 | 1/2016 |
| CN | 105549542 | 5/2016 |
| JP | 61-168457 | 7/1986 |
| JP | 2001-337707 | 12/2001 |
| JP | 2020-027410 | 2/2020 |
| JP | 2020-82196 | 6/2020 |
| WO | 2016/009502 | 1/2016 |

\* cited by examiner

FIG. 2

| TOOL NUMBER | EDGE NUMBER | TOOL OFFSET AMOUNT (X) | TOOL OFFSET AMOUNT (Z) | TOOL NOSE RADIUS COMPENSATION AMOUNT (D) |
|---|---|---|---|---|
| 100 | 1 | 4.5mm | 0.0mm | 0.8mm |
|  | 2 | 5.0mm | 0.0mm | 0.4mm |
|  | 3 | 5.5mm | 0.0mm | 0.2mm |
| ... |  |  |  |  |

210

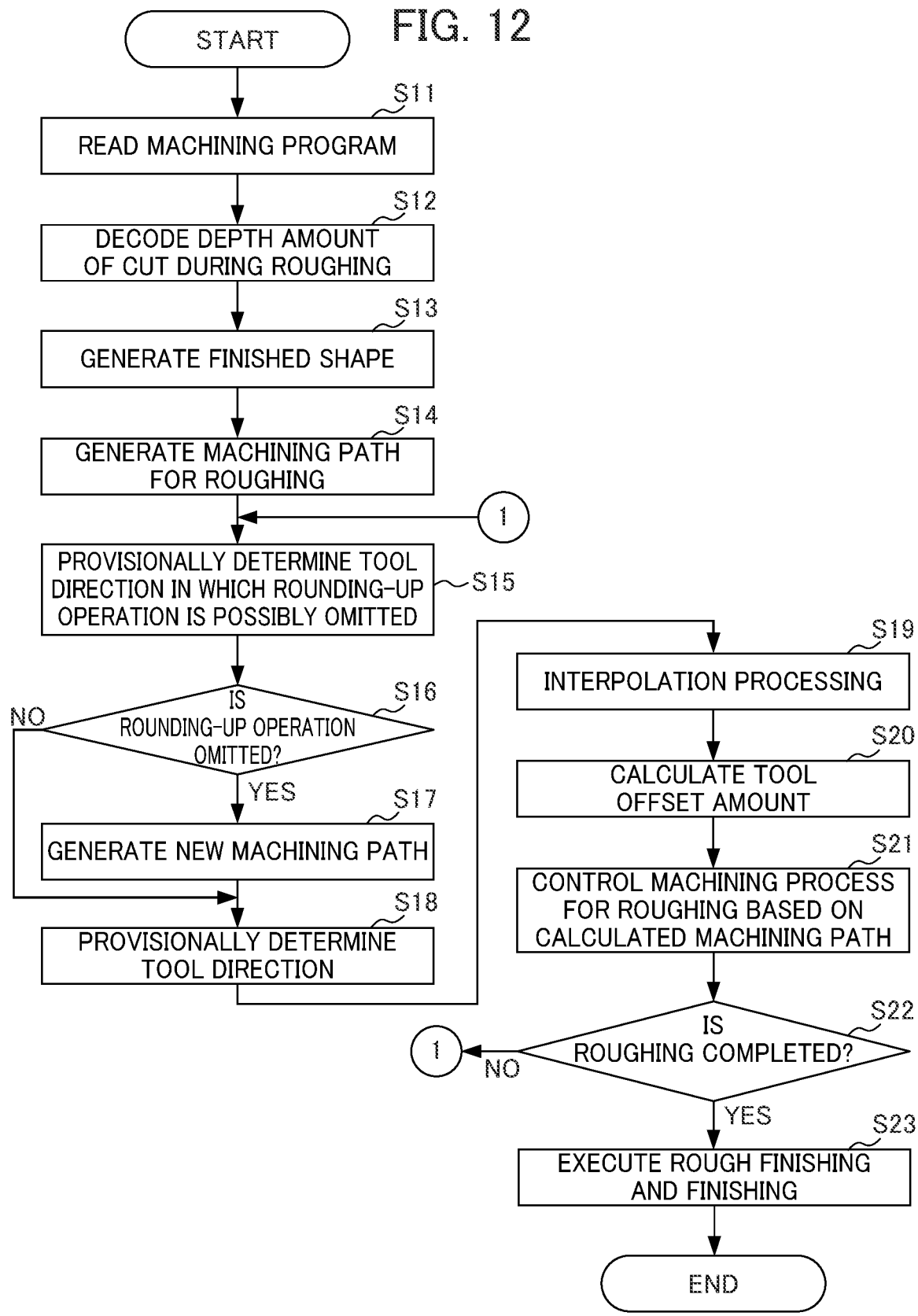

NUMERICAL CONTROLLER AND CONTROL METHOD

TECHNICAL FIELD

The present invention relates to a numerical controller and a control method.

BACKGROUND ART

A technique has been known in which a final finished shape is given at the time of turning of a workpiece from a workpiece form and a path from roughing to finishing is automatically generated to control an axis according to the generated path and a depth amount of cut specified by a machining program or the like. For example, see Patent Document 1.

Patent Document 1: Japanese Unexamined Patent Application, Publication No. 2001-337707

DISCLOSURE OF THE INVENTION

Problems to be Solved by the Invention

In the related art, there may be a case where a round-up operation is inserted after deep cutting during roughing in order to minimize the remaining scrap amount before finishing. In this case, paths of turning increase and a cycle time increases due to the insertion of the round-up operation.

Therefore, it is desirable to shorten a machining path and shorten a cycle time in turning.

Means for Solving the Problems

An aspect of the present disclosure is to provide a numerical controller that controls a machine tool capable of freely changing a relative direction of a cutting tool with respect to a workpiece and performs turning on the workpiece, the numerical controller including: an NC command decoding unit configured to decode a command of a machining program; and a tool information storage/generation unit configured to generate and store geometrical information related to the tool, the NC command decoding unit including a depth-amount-of-cut decoding unit configured to decode a depth amount of cut during roughing from a command of the machining program, a machining geometry generation unit configured to generate a finished shape of the workpiece from the command, a machining path generation unit configured to generate a path for roughing based on the decoded depth amount of cut during the roughing and the generated finished shape of the workpiece, a tool direction provisional-determination unit configured to provisionally determine a direction of the tool, based on the geometrical information related to the tool, and a depth of cut and a round-up path generated by the machining path generation unit, a path connection determination unit configured to determine whether to omit a round-up operation, based on the direction of the tool provisionally determined, the depth of cut, and the round-up path, a machining path connection unit configured to, when the path connection determination unit determines to omit the round-up operation, omit the round-up operation and generate a new path that directly moves to an end point of an operation next to the omitted round-up operation, and a tool direction determination unit configured to determine the direction of the tool for each machining geometry change point, at which the finished shape of the workpiece changes, in the path for roughing including the new path generated by the machining path connection unit.

An aspect of the present disclosure is to provide a control method for a machine tool to be implemented by a computer, the machine tool being capable of freely changing a relative direction of a cutting tool with respect to a workpiece, the control method including: an NC command decoding step of decoding a command of a machining program; and a tool information storage/generation step of generating and storing geometrical information related to the tool, the NC command decoding step including a depth-amount-of-cut decoding step of decoding a depth amount of cut during roughing from a command of the machining program, a machining geometry generation step of generating a finished shape of the workpiece from the command, a machining path generation step of generating a path for roughing based on the decoded depth amount of cut during the roughing and the generated finished shape of the workpiece, a tool direction provisional-determination step of provisionally determining a direction of the tool, based on the geometrical information related to the tool, and a depth of cut and a round-up path generated in the machining path generation step, a path connection determination step of determining whether to omit a round-up operation, based on the direction of the tool provisionally determined, the depth of cut, and the round-up path, a machining path connection step of, when the path connection determination unit determines to omit the round-up operation, omitting the round-up operation and generating a new path that directly moves to an end point of an operation next to the omitted round-up operation, and a tool direction determination step of determining the direction of the tool for each machining geometry change point, at which the finished shape of the workpiece changes, in the path for roughing including the generated new path.

Effects of the Invention

According to the aspects, it is possible to shorten a machining path and shorten a cycle time in turning.

BRIEF DESCRIPTION OF THE DRAWINGS

FIG. 2 is a diagram showing an example of tool information data;

FIG. 12 is a flowchart illustrating an example of NC command execution processing of the numerical controller;

PREFERRED MODE FOR CARRYING OUT THE INVENTION EMBODIMENT

First, the present embodiment will be schematically described. In the present embodiment, the numerical controller decodes a command of a machining program, decodes a depth amount of cut of a tool during roughing for a workpiece based on the decoded command of the machining program, and generates a finished shape of the workpiece. The numerical controller generates a path of the tool during roughing based on the depth amount of cut during the roughing and the finished shape of the workpiece. The numerical controller provisionally determines a tool direction, in which a round-up operation can be omitted, from geometrical information indicating a shape of the tool and a depth of cut and a round-up path on the tool path generated during the roughing such that a remaining scrap amount and a round-up tool length of the tool are minimized, and determines that the round-up operation is omitted when the remaining scrap amount in the tool direction provisionally determined is equal to or less than a first predetermined value set in advance and the round-up tool length of the tool is equal to or less than a second predetermined value different from the first predetermined value set in advance. The numerical controller generates a new path that moves directly to an end point of an operation next to the omitted round-up operation.

Thus, according to the present embodiment, it is possible to solve a problem of "shortening the machining path and shortening a cycle time in turning".

The above is the outline of the present embodiment.

Next, a configuration of the present embodiment will be described in detail with reference to the drawings. Here, a multi-edge tool is exemplified as the tool. The present invention can also be applied to tools having a tilting mechanism as will be described below.

Figure 1:
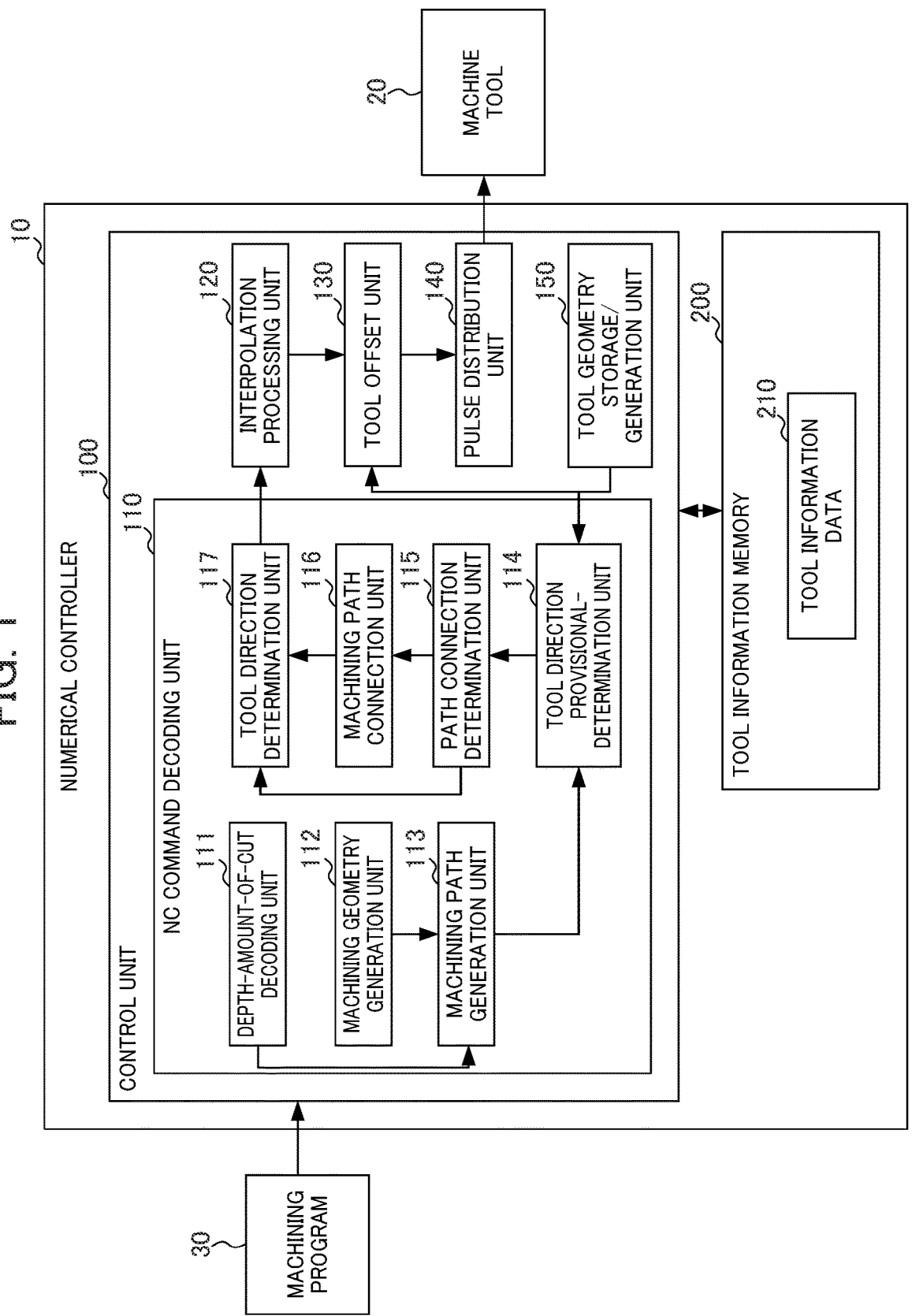
FIG. 1 is a functional block diagram showing a functional configuration example of a numerical controller according to an embodiment.

FIG. 1 is a functional block diagram showing a configuration example of a numerical controller according to the embodiment.

A numerical controller 10 and a machine tool 20 may be directly connected to each other via a connection interface (not shown). The numerical controller 10 and the machine tool 20 may be connected to each other via a network (not shown) such as an LAN (Local Area Network) or the Internet. In this case, the numerical controller 10 and the machine tool 20 include a communication unit (not shown) configured to perform mutual communication through such connection.

The machine tool 20 is, for example, a lathe for turning known to those skilled in the art, and operates based on an operation command from the numerical controller 10, which will be described below.

The numerical controller 10 is a numerical controller known to those skilled in the art, generates an operation command based on control information, and transmits the generated operation command to the machine tool 20. Thus, the numerical controller 10 controls the operation of the machine tool 20.

As shown in FIG. 1, the numerical controller 10 includes a control unit 100 and a tool information memory 200. Further, the control unit 100 includes an NC command decoding unit 110, an interpolation processing unit 120, a tool offset unit 130, a pulse distribution unit 140, and a tool geometry storage/generation unit 150. Further, the NC command decoding unit 110 includes a depth-amount-of-cut decoding unit 111, a machining geometry generation unit 112, a machining path generation unit 113, a tool direction provisional-determination unit 114, a path connection determination unit 115, machining path connection unit 116, and a tool direction determination unit 117.

<Tool Information Memory 200>

The tool information memory 200 is a storage unit such as SSD (Solid State Drive) or HDD (Hard Disk Drive). The tool information memory 200 stores tool information data 210.

FIG. 2 is a diagram showing an example of the tool information data 210.

As shown in FIG. 2, the tool information data 210 includes a storage zone for storing a tool number assigned to each multi-edge tool to be registered selectable in the machine tool 20, an edge number assigned to each edge for each multi-edge tool, a tool offset amount in an X-axis direction and a Z-axis direction set in advance for each edge, and a tool nose radius compensation amount.

The tool information data 210 may include a storage zone for storing an edge length for each multi-edge tool.

The tool information data 210 may store tool numbers, for example, "100" assigned to respective multi-edge tools to be registered, as described above.

Further, the tool information data 210 stores edge numbers "1" to "3" which are assigned to the multi-edge tool with the tool number "100". This indicates that the multi-edge tool with the tool number "100" has three edges.

Figure 3:
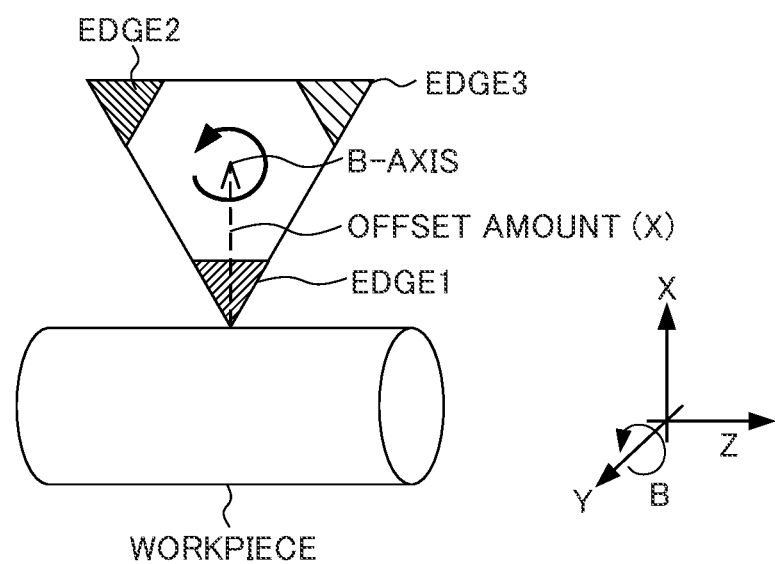
FIG. 3 is a diagram showing an example of a multi-edge tool.

FIG. 3 is a diagram showing an example of a multi-edge tool with a tool number "100". The multi-edge tool with the tool number "100" has an edge for roughing at edge number "1", an edge for semi-finishing at edge number "2", and an edge for finishing at edge number "3". Thus, the multi-edge tool in FIG. 3 can continuously perform roughing, semi-finishing, and finishing by rotating a B-axis (around a Y-axis). Then, the tool information data 210 stores in advance an offset amount in the X-axis direction, an offset amount in the Z-axis direction, and a tool nose radius compensation amount for each of edge numbers "1" to "3".

<Control Unit 100>

The control unit 100 includes, for example, a CPU, a ROM, a RAM, and a CMOS memory which are configured to communicate with each other via a bus, as known to those skilled in the art.

The CPU is a processor that controls the numerical controller 10 as a whole. The CPU reads, via the bus, a system program and an application program stored in the ROM, and controls the numerical controller 10 as a whole according to the system program and the application program. Thus, as shown in FIG. 1, the control unit 100 is configured to realize functions of the NC command decoding unit 110, the interpolation processing unit 120, the tool offset unit 130, the pulse distribution unit 140, and the tool geometry storage/generation unit 150. Further, the NC command decoding unit 110 is configured to realize functions of the depth-amount-of-cut decoding unit 111, the machining geometry generation unit 112, the machining path generation unit 113, the tool direction provisional-determination unit 114, the path connection determination unit 115, the machining path connection unit 116, and the tool direction determination unit 117. The RAM stores various data, for example, temporary calculation data and display data. The CMOS memory is backed up by a battery (not shown) and is configured as a nonvolatile memory that retains a memory state even when the numerical controller 10 is powered off.

<NC Command Decoding Unit 110>

The NC command decoding unit 110 acquires a machining program 30 generated by an external device such as a CAD/CAM device, and analyzes the acquired machining program 30.

<Depth-amount-of-cut Decoding Unit 111>

For example, the depth-amount-of-cut decoding unit 111 pre-reads a plurality of blocks included in the machining program 30, and decodes a depth amount of cut during roughing from NC commands in the plurality of pre-read blocks.

<Machining Geometry Generation Unit 112>

For example, the machining geometry generation unit 112 pre-reads a plurality of blocks included in the machining program 30, and generates, as machining geometry information, a finished shape of the workpiece from NC commands in the plurality of pre-read blocks.

Specifically, the machining geometry generation unit 112 reads an edge movement direction command (X_Z) in an automatic determination mode for edge direction (G41.9/G42.9), and stores it as a position vector (machining geometry information) of a tool tip. In other words, the machining geometry generation unit 112 stores all movement commands for moving on the tool path, as position vectors (machining geometry information).

The machining geometry generation unit 112 may store, as the position vector (machining geometry information), not only for direct G00/G01/G02/G03 commands but also for commands that internally operate with G00/G01/G02/G03 such as canned cycles. Further, the machining geometry generation unit 112 may read blocks until an edge indexing axis positioning mode cancel (G40) is read.

<Machining Path Generation Unit 113>

The machining path generation unit 113 generates a machining path for roughing based on the depth amount of cut during the roughing decoded by the depth-amount-of-cut decoding unit 111 and the finished shape of the workpiece generated by the machining geometry generation unit 112.

Figure 4:
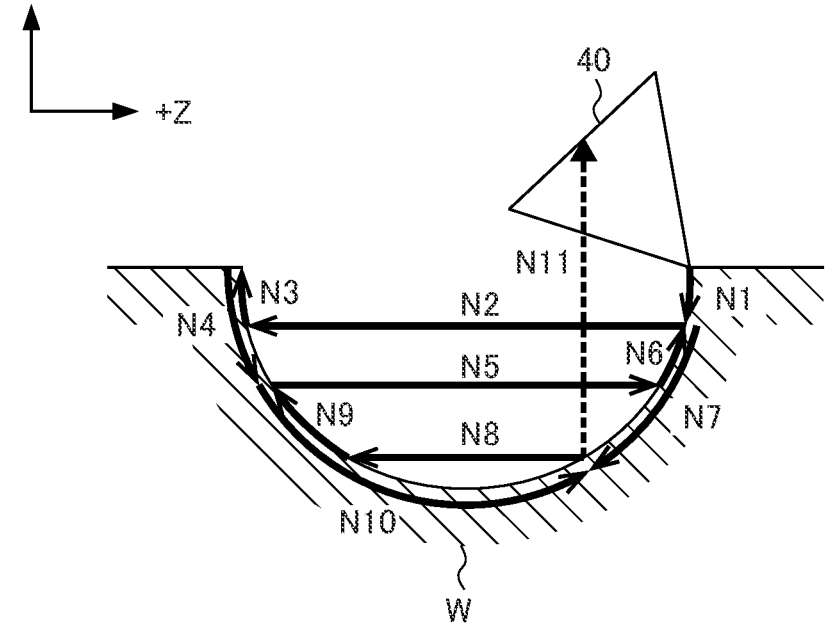
FIG. 4 is a diagram showing an example of machining paths for roughing generated by a machining path generation unit.

In the following description, a machining path for roughing in a case of cutting a semi-circular groove as a finished shape will be exemplified. However, the same applies to a case of cutting an arbitrary shape as a finished shape. FIG. 4 is a diagram showing an example of a machining path for roughing generated by the machining path generation unit 113.

As shown in FIG. 4, for example, in a case of cutting the semi-circular groove as a finished shape for the workpiece W, the machining path generation unit 113 generates, as machining paths for roughing, machining paths N1 to N11 depending on the depth amount of cut of the edge for roughing of the multi-edge tool 40. N1 to N11 indicates sequence number (blocks) of the machining program 30, for example. Further, the machining paths N3, N6, and N9 are paths for round-up operations, and the machining path N11 indicated by broken lines is a retract path after completion of the roughing. In addition, an initial position of the edge of the multi-edge tool 40 is at a start point of the machining path N1 as shown in FIG. 4, and an edge direction of the multi-edge tool 40 at the start of machining is a direction shown in FIG. 4.

<Tool Direction Provisional-Determination Unit 114>

The tool direction provisional-determination unit 114 provisionally determines the edge direction of the multi-edge tool 40 in which the round-up operation is possibly omitted, based on the geometrical information generated by the tool geometry storage/generation unit 150, which will be described below, and related to the multi-edge tool 40 and the depth of cut and the round-up path generated by the machining path generation unit 113, for example.

Figure 5:
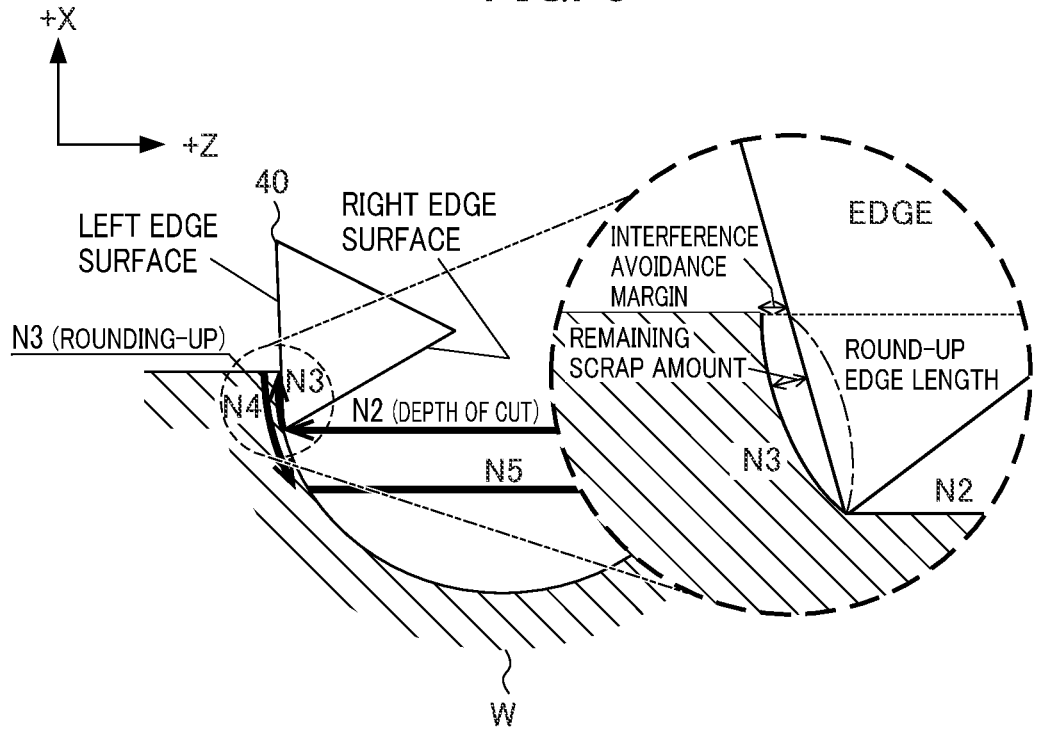
FIG. 5 is a diagram showing an example when the multi-edge tool is at an end point of a machining path N2 in the machining paths shown in FIG. 4.

FIG. 5 is a diagram showing an example when the multi-edge tool 40 is at an end point of the machining path N2 in the machining paths shown in FIG. 4. A circular portion indicated by a broken line on a right side in FIG. 5 is an enlarged view of a circular portion indicated by a broken line on a left side in FIG. 5.

Specifically, for example, when a tip of the edge of the multi-edge tool 40 is at the end point of the machining path N2, the tool direction provisional-determination unit 114 provisionally determines the edge direction of the multi-edge tool 40, in which the round-up operation is possibly omitted, such that a left edge surface of the multi-edge tool 40 does not interfere with the workpiece W (that is, the machining path N3). In other words, as shown in the enlarged view on the right side in FIG. 5, when the tip of the edge of the multi-edge tool 40 is at the end point of the machining path N2, the tool direction provisional-determination unit 114 provisionally determines the edge direction of the multi-edge tool 40 so as to take a minimum margin (hereinafter, also referred to as "interference avoidance margin") in which the multi-edge tool 40 and the workpiece W do not interfere with each other.

Figure 6:
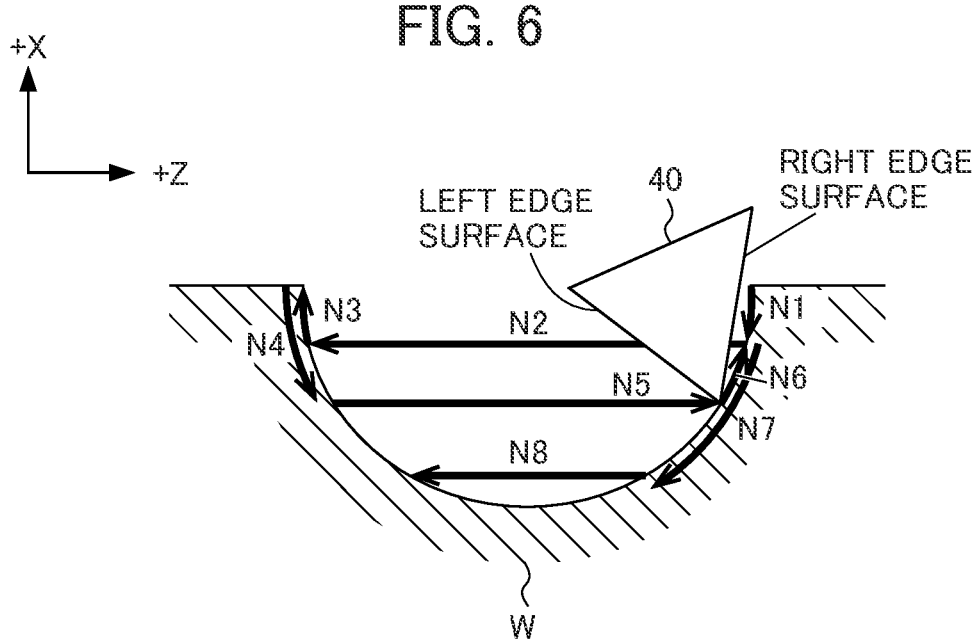
FIG. 6 is a diagram showing an example when the multi-edge tool is at an end point of a machining path N5 in the machining paths shown in FIG. 4.

FIG. 6 is a diagram showing an example when the multi-edge tool 40 is at an end point of the machining path N5 in the machining paths in FIG. 4.

As in the case of FIG. 5, when the tip of the edge of the multi-edge tool 40 is at the end point of the machining path N5, the tool direction provisional-determination unit 114 provisionally determines the edge direction of the multi-edge tool 40, in which the round-up operation is possibly omitted, such that a right edge surface of the multi-edge tool 40 does not interfere with the workpiece W (that is, the machining paths N1 and N6). In other words, as shown in FIG. 6, the tool direction provisional-determination unit 114 provisionally determines the edge direction of the multi-edge tool 40, in which the round-up operation is possibly omitted, so as to take a minimum interference avoidance margin in which the multi-edge tool 40 and the workpiece W do not interfere with each other.

Figure 7:
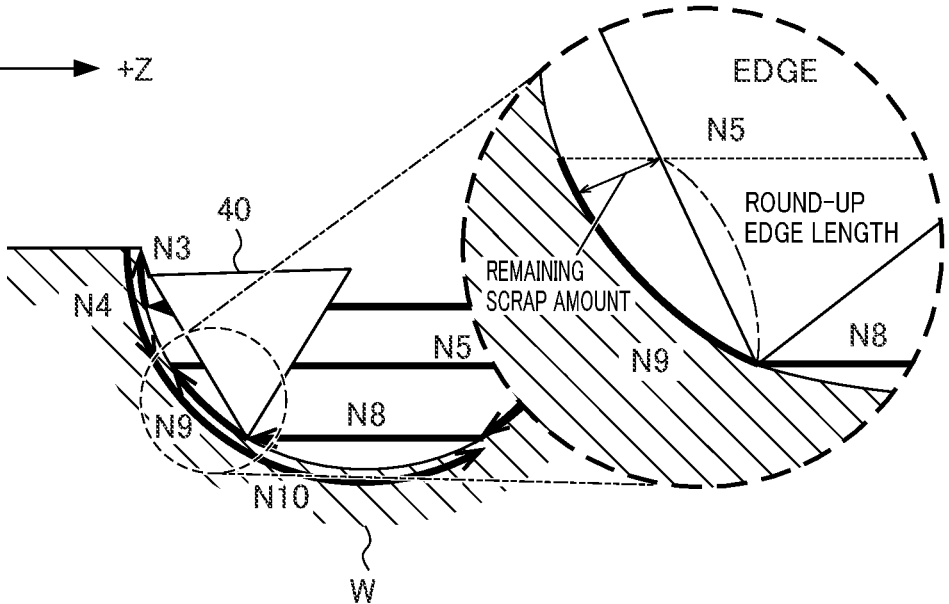
FIG. 7 is a diagram showing an example when the multi-edge tool is at an end point of a machining path N8 in the machining paths shown in FIG. 4.

FIG. 7 is a diagram showing an example when the multi-edge tool 40 is at an end point of the machining path N8 in the machining paths in FIG. 4. A circular portion indicated by a broken line on a right side in FIG. 7 is an enlarged view of a circular portion indicated by a broken line on a left side in FIG. 7.

As in the case of FIG. 5, when the tip of the edge of the multi-edge tool 40 is at the end point of the machining path N8, the tool direction provisional-determination unit 114 provisionally determines the edge direction of the multi-edge tool 40, in which the round-up operation is possibly omitted, such that a left edge surface of the multi-edge tool 40 does not interfere with the workpiece W (that is, the machining paths N3, N4, and N9). In other words, as shown in the enlarged view on the right side in FIG. 7, when the tip of the edge of the multi-edge tool 40 is at the end point of the machining path N8, the tool direction provisional-determination unit 114 provisionally determines the edge direction of the multi-edge tool 40 so as to take an interference avoidance margin in which the multi-edge tool 40 and the workpiece W do not interfere with each other.

<Path connection Determination Unit 115>

The path connection determination unit 115 determines whether the round-up operation is omitted in the machining paths N3, N6, and N9, based on the edge direction of the multi-edge tool 40 in which the round-up operation is possibly omitted, and the depth of cut and the round-up path generated by the machining path generation unit 113, the edge direction being provisionally determined by the tool direction provisional-determination unit 114.

Specifically, for example, as shown in FIG. 5, the path connection determination unit 115 calculates a round-up edge length and a remaining scrap amount (a longest distance between the machining path N3 and the left edge surface of the multi-edge tool 40) when the multi-edge tool 40 faces in the edge direction provisionally determined at the end point of the machining path N2 (that is, a start point of the machining path N3). When the calculated remaining scrap amount is equal to or less than a preset threshold value α and the calculated round-up edge length is equal to or less than a preset threshold value β, since the remaining scrap amount and the round-up edge length are sufficiently small, the path connection determination unit 115 determines that the round-up operation of the machining path N3 can be omitted. On the other hand, when the calculated remaining scrap amount is larger than the preset threshold value α or the calculated round-up edge length is larger than the preset threshold value β, since the remaining scrap amount of the round-up edge length are sufficiently large, the path connection determination unit 115 determines that the round-up operation of the machining path N3 cannot be omitted.

Similarly, for example, as shown in FIG. 6, the path connection determination unit 115 calculates a round-up edge length and a remaining scrap amount (a longest distance between the machining path N6 and the right edge surface of the multi-edge tool 40) when the multi-edge tool 40 faces in the edge direction provisionally determined at the end point of the machining path N5 (that is, a start point of the machining path N6). When the calculated remaining scrap amount is equal to or less than the preset threshold value x and the calculated round-up edge length is equal to or less than the preset threshold value β, since the remaining scrap amount and the round-up edge length are sufficiently small, the path connection determination unit 115 determines that the round-up operation of the machining path N6 can be omitted. On the other hand, when the calculated remaining scrap amount is larger than the preset threshold value x or the calculated round-up edge length is larger than the preset threshold value β, since the remaining scrap amount of the round-up edge length are sufficiently large, the path connection determination unit 115 determines that the round-up operation of the machining path N6 cannot be omitted.

Further, for example, as shown in FIG. 7, the path connection determination unit 115 calculates a round-up edge length and a remaining scrap amount (a longest distance between the machining path N9 and the left edge surface of the multi-edge tool 40) when the multi-edge tool 40 faces in the edge direction provisionally determined at the end point of the machining path N8 (that is, a start point of the machining path N9). When the calculated remaining scrap amount is equal to or less than the preset threshold value x and the calculated round-up edge length is equal to or less than the preset threshold value β, since the remaining scrap amount and the round-up edge length are sufficiently small, the path connection determination unit 115 determines that the round-up operation of the machining path N9 can be omitted. On the other hand, when the calculated remaining scrap amount is larger than the preset threshold value α or the calculated round-up edge length is larger than the preset threshold value α, since the remaining scrap amount of the round-up edge length are sufficiently large, the path connection determination unit 115 determines that the round-up operation of the machining path N9 cannot be omitted.

<Machining Path Connection Unit 116>

When the path connection determination unit 115 determines that the round-up operation is omitted, the machining path connection unit 116 omits the round-up operation, and generates a new machining path that directly moves to an end point of an operation (machining path) next to the omitted round-up operation.

Figure 8:
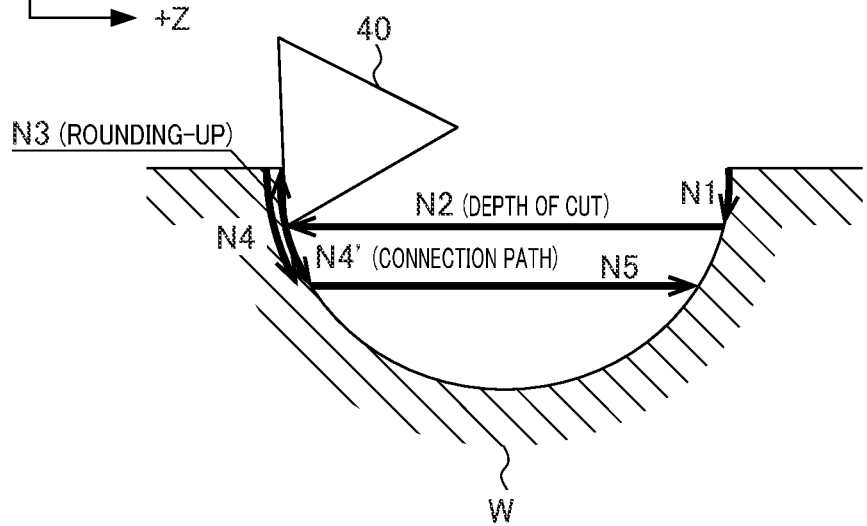
FIG. 8 is a diagram showing an example of a connecting process of a machining path connection unit in a case of determining that a round-up operation of the machining path N3 in FIG. 5 can be omitted.

FIG. 8 is a diagram showing an example of a connecting process of the machining path connection unit 116 in a case of determining that the round-up operation of the machining path N3 in FIG. 5 can be omitted.

Specifically, for example, as shown in FIG. 8, the machining path connection unit 116 omits the round-up operation of the machining path N3, and generates a new machining path N4' that directly moves from the end point of the machining path N2 to the end point of the machining path N4.

Figure 9:
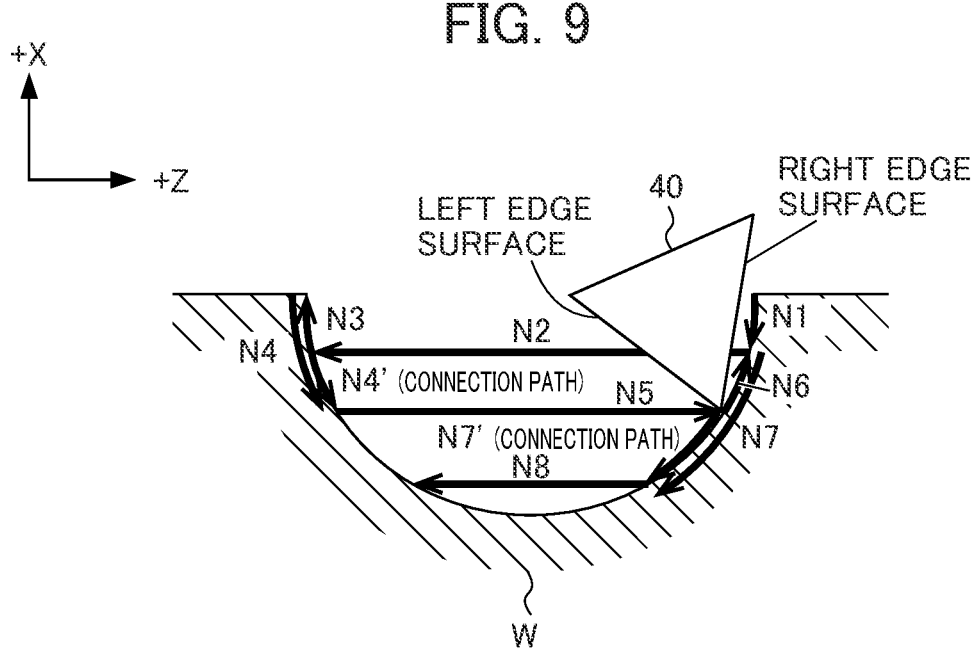
FIG. 9 is a diagram showing an example of a connecting process of the machining path connection unit in a case of determining that a round-up operation of the machining path N6 in FIG. 6 can be omitted.

FIG. 9 is a diagram showing an example of a connecting process of the machining path connection unit 116 in a case of determining that the round-up operation of the machining path N6 in FIG. 6 can be omitted.

As in the case in FIG. 8, as shown in FIG. 9, the machining path connection unit 116 omits the round-up operation of the machining path N6, and generates a new machining path N7' that directly moves from the end point of the machining path N5 to the end point of the machining path N7.

Figure 10:
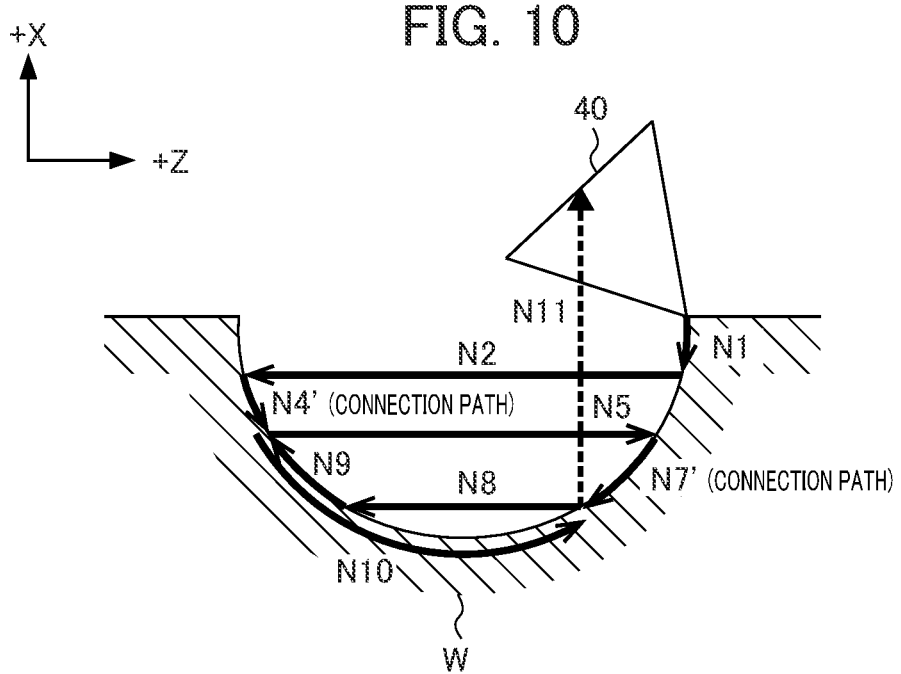
FIG. 10 is a diagram showing an example of a result of the connecting process of the machining path connection unit for the machining paths in FIG. 4.

FIG. 10 is a diagram showing an example of a result of the connecting process of the machining path connection unit 116 for the machining paths in FIG. 4. In the machining paths in FIG. 10, since the remaining scrap amount is larger than the threshold value α or the round-up edge length is larger than the threshold value β when the multi-edge tool 40 faces in the edge direction provisionally determined at the end point of the machining path N8 shown in FIG. 7, the path connection determination unit 115 determines that the round-up operation of the machining path N9 cannot be omitted, and the machining path N9 remains as it is.

<Tool Direction Determination Unit 117>

In the machining path for roughing generated by the machining path generation unit 113 or the machining path for roughing including the new machining path generated by the machining path connection unit 116, the tool direction determination unit 117 determines an edge direction of the multi-edge tool 40 for each machining geometry change point at which the finished shape of the workpiece W changes.

Specifically, when an angle between a machining path N(i) and a machining path N(i+1) is less than 180 degrees at a point (hereinafter, also referred to as "machining geometry change point") Pi at which the machining path N(i) is switched to the machining path N(i+1), the tool direction determination unit 117 determines, as an edge direction (a positioning angle of an edge indexing axis), an angle at which a center line of the angle between the machining path N(i) and the machining path N(i+1) coincides with a center line of an edge tip point of the multi-edge tool 40. Here, a symbol i represents an integer from 1 to 10.

Figure 11A:
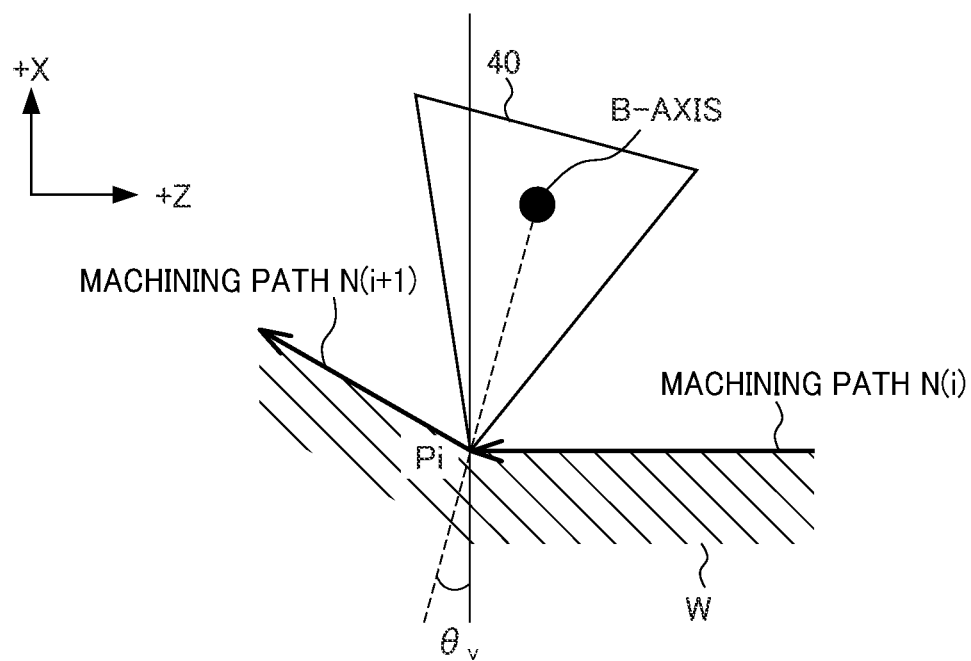
FIG. 11A is a diagram showing an example of a case where an angle between machining paths is less than 180 degrees at a machining geometry change point.

FIG. 11A is a diagram showing an example of a case where an angle between machining paths is less than 180 degrees at a machining geometry change point Pi.

As shown in FIG. 11A, the tool direction determination unit 117 determines an edge direction such that a bisector of an angle formed by a machining path N(i) and a machining path N(i+1) at a machining geometry change point Pi coincides with a center of an edge tip angle of the multi-edge tool 40. Here, a symbol Ov represents an angle (clockwise direction) between a direction of the bisector of the angle formed by the machining path N(i) and the machining path N(i+1) at the machining geometry change point Pi and the X-axis direction.

Further, when the angle between the machining path N(i) and the machining path N(i+1) is equal to or more than 180 degrees at the machining geometry change point Pi, the tool direction determination unit 117 may determine, as an edge direction (a positioning angle of an edge indexing axis), an angle at which a direction perpendicular to the cutting surface of each of the machining paths N(i) and N(i+1) coincides with the center line of the edge tip point of the multi-edge tool 40.

Figure 11B:
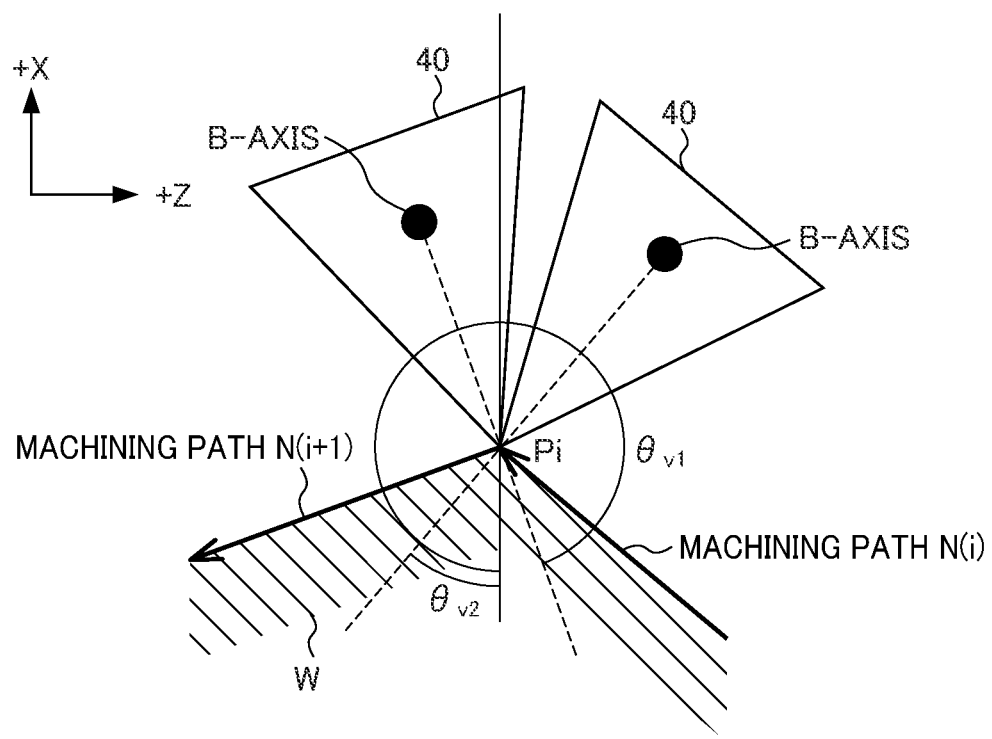
FIG. 11B is a diagram showing an example of a case where an angle between machining paths is equal to or more than 180 degrees at a machining geometry change point.

FIG. 11B is a diagram showing an example of a case where angle between machining paths is equal to or more than 180 degrees at a machining geometry change point Pi.

As shown in FIG. 11B, the tool direction determination unit 117 determines an edge direction such that a direction (a broken line) perpendicular to the cutting surface of each of the machining path N(i) and the machining path N(i+1) at the machining geometry change point Pi coincides with the center of the edge tip angle of the multi-edge tool 40. Here, symbols $\theta_{v1}$ and $\theta_{v2}$ represent angles (clockwise direction) between the directions (workpiece side) perpendicular to the cutting surfaces of the machining path N(i) and the machining path N(i+1) at the machining geometry change point Pi and the X-axis direction.

<Interpolation Processing Unit 120>

The interpolation processing unit 120 performs interpolation processing on the machining path received from the NC command decoding unit 110, and calculates a command position and a command speed.

<Tool Offset Unit 130>

The tool offset unit 130 calculates a tool offset amount using the selected position offset amount and tool nose radius compensation amount of the multi-edge tool 40 and the geometrical information of the multi-edge tool 40 generated by the tool geometry storage/generation unit 150 which will be described below.

<Pulse Distribution Unit 140>

The pulse distribution unit 140 outputs a pulse for each axis movement of the calculated tool offset to each servo motor (not shown) included in the machine tool 20.

<Tool geometry Storage/Generation Unit 150>

The tool geometry storage/generation unit 150 generates geometrical information of the multi-edge tool 40 based on the tool information data 210 retained in the tool information memory 200.

<NC Command Execution Processing of Numerical Controller 10>

Next, a description will be given with respect to an example of the operation related to the NC command execution processing of the numerical controller 10 in a case of performing roughing based on the machining program 30 that causes the multi-edge tool 40 to perform turning.

FIG. 12 is a flowchart illustrating an example of NC command execution processing of the numerical controller 10.

In Step S11, the NC command decoding unit 110 reads the machining program 30.

In Step S12, the depth-amount-of-cut decoding unit 111 pre-reads a plurality of blocks included in the machining program 30, and decodes a depth amount of cut during roughing from NC commands in the plurality of pre-read blocks.

In Step S13, the machining geometry generation unit 112 pre-reads a plurality of blocks included in the machining program 30, and generates a finished shape of the workpiece from NC commands in the plurality of pre-read blocks.

In Step S14, the machining path generation unit 113 generates a machining path for roughing based on the depth amount of cut for roughing decoded in Step S12 and the finished shape of the workpiece generated in Step S13.

In Step S15, the tool direction provisional-determination unit 114 provisionally determines the edge direction of the multi-edge tool 40 in which the round-up operation is possibly omitted, based on the geometrical information related to the multi-edge tool 40 generated by the tool geometry storage/generation unit 150 and the depth of cut and the round-up path in the machining paths for roughing generated in Step S14.

In Step S16, the path connection determination unit 115 determines whether the round-up operation is omitted, based on the edge direction of the multi-edge tool 40 provisionally determined in Step S15 and the depth of cut and the round-up path generated in Step S14. When the round-up operation is omitted, the process proceeds to Step S17. On the other hand, when the round-up operation is not omitted, the process proceeds to Step S18.

In Step S17, the machining path connection unit 116 generates a new machining path that directly moves to the end point of the operation (machining path) next to the round-up operation determined to be omitted in Step S16.

In Step S18, the tool direction determination unit 117 determines the edge direction of the multi-edge tool 40 for each machining geometry change point on the machining path for roughing.

In Step S19, the interpolation processing unit 120 performs interpolation processing on the machining path received from the NC command decoding unit 110, and calculates a command position and a command speed.

In Step S20, the tool offset unit 130 calculates the tool offset amount using the selected position offset amount (for example, turning tool) and tool nose radius compensation amount of the multi-edge tool 40 and the tool geometry information of the multi-edge tool 40 generated by the tool geometry storage/generation unit 150.

In Step S21, the numerical controller 10 controls the machining process for roughing based on the generated machining path.

In Step S22, the numerical controller 10 determines whether the machining process for roughing instructed by the machining program 30 is completed. When the machining process for roughing is completed, the process proceeds to Step S23. When the machining process for roughing is not completed, the process proceeds to Step S15.

In Step S23, the numerical controller 10 executes rough finishing (semi-finishing) and finishing.

As described above, the numerical controller 10 provisionally determines the edge direction of the multi-edge tool 40, based on the geometrical information related to the multi-edge tool 40 and the generated depth of cut and round-up path in the machining paths for roughing. The numerical controller 10 determines whether the round-up operation can be omitted, based on the provisionally determined edge direction of the multi-edge tool 40 and the generated depth of cut and round-up path. When it is determined that the round-up operation can be omitted, the numerical controller 10 generates a new path that directly moves to the end point of the operation next to the omitted round-up operation.

Thus, the numerical controller 10 can shorten the roughing path and shorten a cycle time in turning. In other words, the numerical controller 10 can unify finishing operations from the depth of cut by appropriately determining the edge direction of the multi-edge tool 40, thereby shortening the cycle time for roughing.

The embodiment has been described above, but the numerical controller 10 is not limited to the above-described embodiment, and includes, for example, modifications and improvements within a range that can achieve the purpose.

Modification Example 1

In the above-described embodiment, the numerical controller 10 is the device different from the machine tool 20, but is not limited thereto. For example, the numerical controller 10 may be included in the machine tool 20.

Modification Example 2

Figure 13:
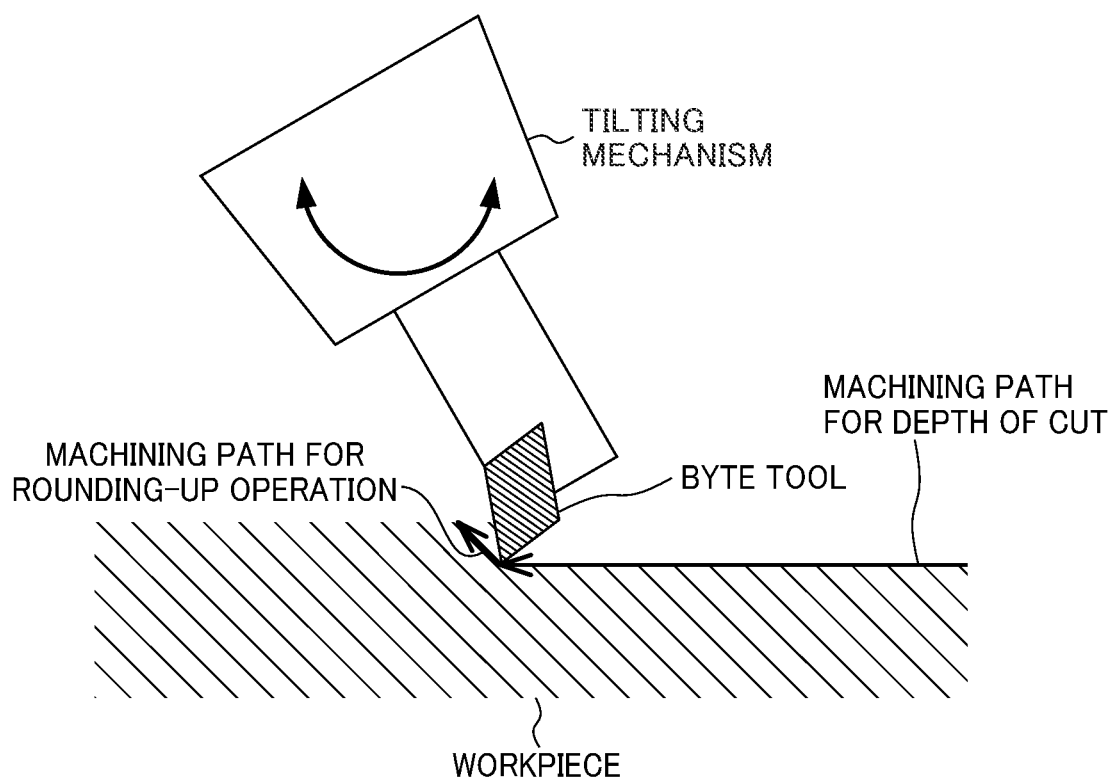
FIG. 13 is a diagram showing an example of a tool with which a byte tool is attached to a tilting mechanism.

Further, for example, in the above-described embodiment, the multi-edge tool 40 is used as a tool, but the present invention is not limited thereto. For example, as shown in FIG. 13, the round-up operation can be omitted as long as the tool can freely change a relative direction of the cutting tool with respect to the workpiece, such as a tool having a tilting mechanism.

Modification Example 3

Figure 14:
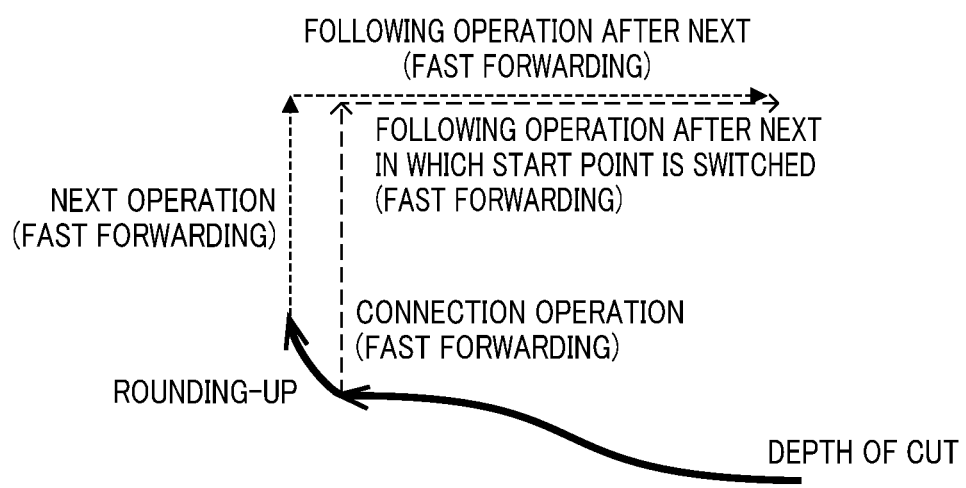
FIG. 14 is a diagram showing an example of a connection operation by the machining path connection unit.

Further, for example, when the path connection determination unit 115 determines to omit the round-up operation, the machining path connection unit 116 omits the round-up operation and generates a new machining path that directly moves to the end point of the operation (machining path) next to the omitted round-up operation, but the present invention is not limited thereto. For example, when the operation next to the omitted round-up operation and an operation subsequent to the next operation are rapid traverse operations, the machining path connection unit 116 may generate, as a connection operation (rapid traverse operation), an operation of switching a start point of the operation subsequent to the operation next to the omitted round-up operation and moving directly from a start point of the omitted round-up operation to the start point after the switching, as shown in FIG. 14.

Thus, the numerical controller 10 can rapidly traverse the tool at once.

Each of the functions included in the numerical controller 10 of the embodiment can be realized by hardware, software, or a combination thereof. Here, being realized by software means that such a function by the software is realized when a computer reads and executes a program.

The program may be stored and supplied to a computer using various types of non-transitory computer readable media. The non-transitory computer readable media include various types of tangible storage media. Examples of the non-transitory computer readable media include a magnetic recording medium (for example, a flexible disk, a magnetic tape, and a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM). Further, these programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

In addition, the steps of describing the program to be recorded on the recording medium include not only a process performed sequentially in a time-series manner but also a process executed in parallel or individually without being necessarily processed in a time-series manner.

In other words, the numerical controller and the control method of the present disclosure can take various embodiments having the following configurations.

(1) The numerical controller 10 of the present disclosure provides a numerical controller that controls a machine tool 20 capable of freely changing a relative direction of a cutting tool with respect to a workpiece W and performs turning on the workpiece W, the numerical controller including: a NC command decoding unit 110 configured to decode a command of a machining program 30; and a tool information storage/generation unit 150 configured to generate and store geometrical information related to the tool, the NC command decoding unit 110 including a depth-amount-of-cut decoding unit 111 configured to decode a depth amount of cut during roughing from a command of the machining program 30, a machining geometry generation unit 112 configured to generate a finished shape of the workpiece W from the command, a machining path generation unit 113 configured to generate a path for roughing based on the decoded depth amount of cut during the roughing and the generated finished shape of the workpiece W, a tool direction provisional-determination unit 114 configured to provisionally determine a direction of the tool, based on the geometrical information related to the tool, and a depth of cut and a round-up path generated by the machining path generation unit 113, a path connection determination unit 115 configured to determine whether to omit a round-up operation, based on the direction of the tool provisionally determined, the depth of cut, and the round-up path, a machining path connection unit 116 configured to, when the path connection determination unit 115 determines to omit the round-up operation, omit the round-up operation and generate a new path that directly moves to an end point of an operation next to the omitted round-up operation, and a tool direction determination unit 117 configured to determine the direction of the tool for each machining geometry change point, at which the finished shape of the workpiece W changes, in the path for roughing including the new path generated by the machining path connection unit 116.

According to the numerical controller 10, it is possible to shorten the machining path and to shorten a cycle time in turning.

(2) In the numerical controller 10 according to (1) described above, the tool direction provisional-determination unit 114 may provisionally determine the direction of the tool such that a remaining scrap amount and a round-up tool length of the tool are minimized, and the path connection determination unit 115 may determine that the round-up operation is omitted when the remaining scrap amount in the direction of the tool provisionally determined is equal to or less than a threshold value α set in advance and the round-up tool length of the tool is equal to or less than a threshold value β set in advance.

Thus, the numerical controller 10 can unify finishing operations from the depth of cut by appropriately determining the direction of the tool, thereby shortening the cycle time for roughing.

(3) In the numerical controller 10 according to (1) or (2) described above, when the operation path next to the round-up operation determined to be omitted by the path connection determination unit 115 and an operation subsequent to the next operation are rapid traverse operations, the machining path connection unit 116 may generate, as a connection operation, an operation of switching a start point of the operation subsequent to the next operation and moving directly from a start point of the round-up operation to the start point after the switching.

Thus, the numerical controller 10 can rapidly traverse the tool at once.

(4) In the numerical controller 10 according to any one of (1) to (3) described above, the tool is a multi-edge tool or a tool having a tilting mechanism.

Thus, the numerical controller 10 can achieve the same effects as (1) to (3) described above.

(5) The control method of the present disclosure provides a control method for a machine tool 20 to be implemented by a computer, the machine tool being capable of freely changing a relative direction of a cutting tool with respect to a workpiece W, the control method including: an NC command decoding step of decoding a command of a machining program 30; and a tool information storage/generation step of generating and storing geometrical information related to the tool, the NC command decoding step including a depth-amount-of-cut decoding step of decoding a depth amount of cut during roughing from a command of the machining program 30, a machining geometry generation step of generating a finished shape of the workpiece W from the command, a machining path generation step of generating a path for roughing based on the decoded depth amount of cut during the roughing and the generated finished shape of the workpiece W, a tool direction provisional-determination step of provisionally determining a direction of the tool, based on the geometrical information related to the tool, and a depth of cut and a round-up path generated in the machining path generation step, a path connection determination step of determining whether to omit a round-up operation, based on the direction of the tool provisionally determined, the depth of cut, and the round-up path, a machining path connection step of, when the path connection determination unit determines to omit the round-up operation, omitting the round-up operation and generating a new path that directly moves to an end point of an operation next to the omitted round-up operation, and a tool direction determination step of determining the direction of the tool for each machining geometry change point, at which the finished shape of the workpiece W changes, in the path for roughing including the generated new path.

According to the control method, the same effect as (1) can be obtained.

EXPLANATION OF REFERENCE NUMERALS 10 numerical controller
100 control unit
110 NC command decoding unit
111 depth-amount-of-cut decoding unit
112 machining geometry generation unit
113 machining path generation unit
114 tool direction provisional-determination unit
115 path connection determination unit
116 machining path connection unit
117 tool direction determination unit
120 interpolation processing unit
130 tool offset unit
140 pulse distribution unit
150 tool geometry storage/generation unit
200 tool information memory
210 tool information data
20 machine tool
30 machining program

The invention claimed is:

1. A numerical controller that controls a machine tool capable of freely changing a relative direction of a cutting tool with respect to a workpiece and performs turning on the workpiece, the numerical controller comprising:
a memory configured to store a program; and
a processor configured to execute the program and control the numerical controller to:
decode a command of a machining program; and
generate and store geometrical information related to the tool,
wherein the processor
decodes a depth amount of cut during roughing from a command of the machining program,
generates a finished shape of the workpiece from the command,
generates a path for roughing based on the decoded depth amount of cut during the roughing and the generated finished shape of the workpiece,
provisionally determines a direction of the tool, based on the geometrical information related to the tool, and a depth of cut and a round-up path generated,
determines whether to omit a round-up operation, based on the direction of the tool provisionally determined, the depth of cut, and the round-up path,
omits, when the round-up operation is determined to be omitted, the round-up operation and generate a new path that directly moves to an end point of an operation next to the omitted round-up operation, and
determines the direction of the tool for each machining geometry change point, at which the finished shape of the workpiece changes, in the path for roughing including the generated new path,
wherein the machine tool is controlled by the numerical controller based on the path for roughing in which the round-up operation is omitted so as to be shortened.

2. The numerical controller according to claim 1, wherein the processor provisionally determines the direction of the tool such that a remaining scrap amount and a round-up tool length of the tool are minimized, and the processor determines that the round-up operation is omitted when the remaining scrap amount in the direction of the tool provisionally determined is equal to or less than a first predetermined value set in advance and the round-up tool length of the tool is equal to or less than a second predetermined value different from the first predetermined value set in advance.

3. The numerical controller according to claim 1, wherein when the operation next to the round-up operation determined to be omitted and an operation subsequent to the next operation are rapid traverse operations, the processor generates, as a connection operation, an operation of switching a start point of the operation subsequent to the next operation and moving directly from a start point of the round-up operation to the start point after the switching.

4. The numerical controller according to claim 1, wherein the tool is a multi-edge tool or a tool having a tilting mechanism.

5. A control method for a machine tool to be implemented by a computer as a numerical controller, the machine tool being capable of freely changing a relative direction of a cutting tool with respect to a workpiece, the control method comprising:
    decoding a command of a machining program; and
    generating and storing geometrical information related to the tool,
wherein the control method includes
    decoding a depth amount of cut during roughing from a command of the machining program,
    generating a finished shape of the workpiece from the command,
    generating a path for roughing based on the decoded depth amount of cut during the roughing and the generated finished shape of the workpiece,
    provisionally determining a direction of the tool, based on the geometrical information related to the tool, and a depth of cut and a round-up path generated,
    determining whether to omit a round-up operation, based on the direction of the tool provisionally determined, the depth of cut, and the round-up path,
    omitting, when the path connection determination unit determines to omit the round-up operation, the round-up operation and generating a new path that directly moves to an end point of an operation next to the omitted round-up operation, and
    determining the direction of the tool for each machining geometry change point, at which the finished shape of the workpiece changes, in the path for roughing including the generated new path,
wherein the machine tool is controlled by the numerical controller based on the path for roughing in which the round-up operation is omitted so as to be shortened.

* * * * *